July 30, 1957 J. G. TAYLOR 2,800,767
COMBUSTION SECTION CONSTRUCTION
Filed Dec. 31, 1952 2 Sheets-Sheet 1

INVENTOR
JAMES G. TAYLOR
BY Russell M. Sipes, Jr.
AGENT

July 30, 1957   J. G. TAYLOR   2,800,767
COMBUSTION SECTION CONSTRUCTION
Filed Dec. 31, 1952   2 Sheets-Sheet 2

INVENTOR
JAMES G. TAYLOR

AGENT

United States Patent Office 2,800,767
Patented July 30, 1957

2,800,767
COMBUSTION SECTION CONSTRUCTION

James G. Taylor, West Hartford, Conn., assignor to United Aircraft Corporation, East Hartford, Conn., a corporation of Delaware Application December 31, 1952, Serial No. 328,852

3 Claims. (Cl. 60—39.36)

This invention relates to gas turbine power plants, more particularly to the construction of the combustion section of the power plant.

In gas turbine power plants of the type adapted for use in aircraft, it is important that the physical dimensions and the weight of the power plant be kept at a minimum. The frontal area of the power plant has a direct relation to the drag of the aircraft in which it is installed and, consequently, it is desirable to keep the diameter of the power plant as small as practicable. The overall length of the power plant is not as critical as the frontal area, but must be kept within bounds to permit ready use of the power plant in the wing or in the fuselage of an aircraft without unduly increasing the wing chord or the fuselage length. At the same time, the weight of the power plant should be kept as light as possible in order that the fuel load carried by the airplane is not wasted in propelling a heavy installation through the air, but is efficiently utilized in increased performance of the aircraft.

In keeping within the requirements of minimum physical dimensions and weight, the design and structural arrangement of the combustion section of the power plant is limited. Due to the restricted size of, and the large volume of air handled by, aircraft gas turbine power plants, the velocity of the air flowing through the power plant is quite high. The combustion section must be designed to handle this high velocity flow of air and give as complete combustion as possible over a wide range of fuel rates. At the same time, the pressure drop through the combustion section must be kept at a minimum in order not to penalize power plant performance.

A combustion section comprised of a plurality of cans mounted in a circle around the shaft connecting the power plant compresor and the turbine is the best known construction. Each can comprises an individual combustion chamber or burner, pressure air from the compressor being proportioned among the cans, wherein fuel is injected and the mixture burned. Combustion products exiting from the cans drive a common turbine. A second type of construction is that in which the combustion section comprises an annular duct extending between the compressor and the turbine, the mixing and burning of air and fuel taking place in this large duct rather than in a plurality of separate cans.

The present invention includes a combustion chamber construction which has both the advantage of optimum mixing of fuel and air prevalent in the can construction as well as the advantage of good circumferential temperature distribution prevalent in the annular construction. To accomplish this, a structure, the upstream portion of which comprises a plurality of modified cans forming a ring of openings into the downstream portion, which is completely annular, is provided.

Fuel, and air if desired, are introduced through the upstream end of each of the modified cans and additional air enters and merges with the swirling cone of fuel from each fuel nozzle through one or more rows of encircling holes in the can. This type of mixing is not possible in the annular construction in which air enters only through the oppositely facing walls of the combustion chamber rather than around all sides of the fuel nozzle spray. In the annular portion of the structure, additional air is added for combustion and for cooling purposes. Because of the free communication within this portion an advantage is gained in good circumferential heat distribution as well as the elimination of hot spots at the discharge end of the chamber such as occur at the downstream end of the individual cans in the can construction. For a given combustion chamber size the invention gives the low pressure loss common to the annular construction combined with good combustion efficiency resulting from the improved primary mixing common to the can construction.

Further, the present invention includes a combustion section construction in which the combustion chamber elements are connected to the load carrying structure of the power plant in a single radial plane, permitting unrestricted thermal expansion of the combustion chamber elements radially as well as fore and aft of the plane of attachment.

An object of the invention is to provide improved combustion apparatus particularly, though not exclusively, for aircraft gas turbine power plants.

Another object is to incorporate the desirable characteristics of the can and the annular construction in a structure having the desirable characteristics of both.

Another object is to provide improved combustion apparatus giving the most efficient combustion over a wide range of fuel rates with a minimum pressure drop.

Still another object is to provide an improved combustion section construction in which the combustion chamber elements are free to compensate for differential expansion.

Other objects and advantages will be apparent from the following specification and claims and from the accompanying drawing which illustrate an embodiment of the invention.

Figure 1:
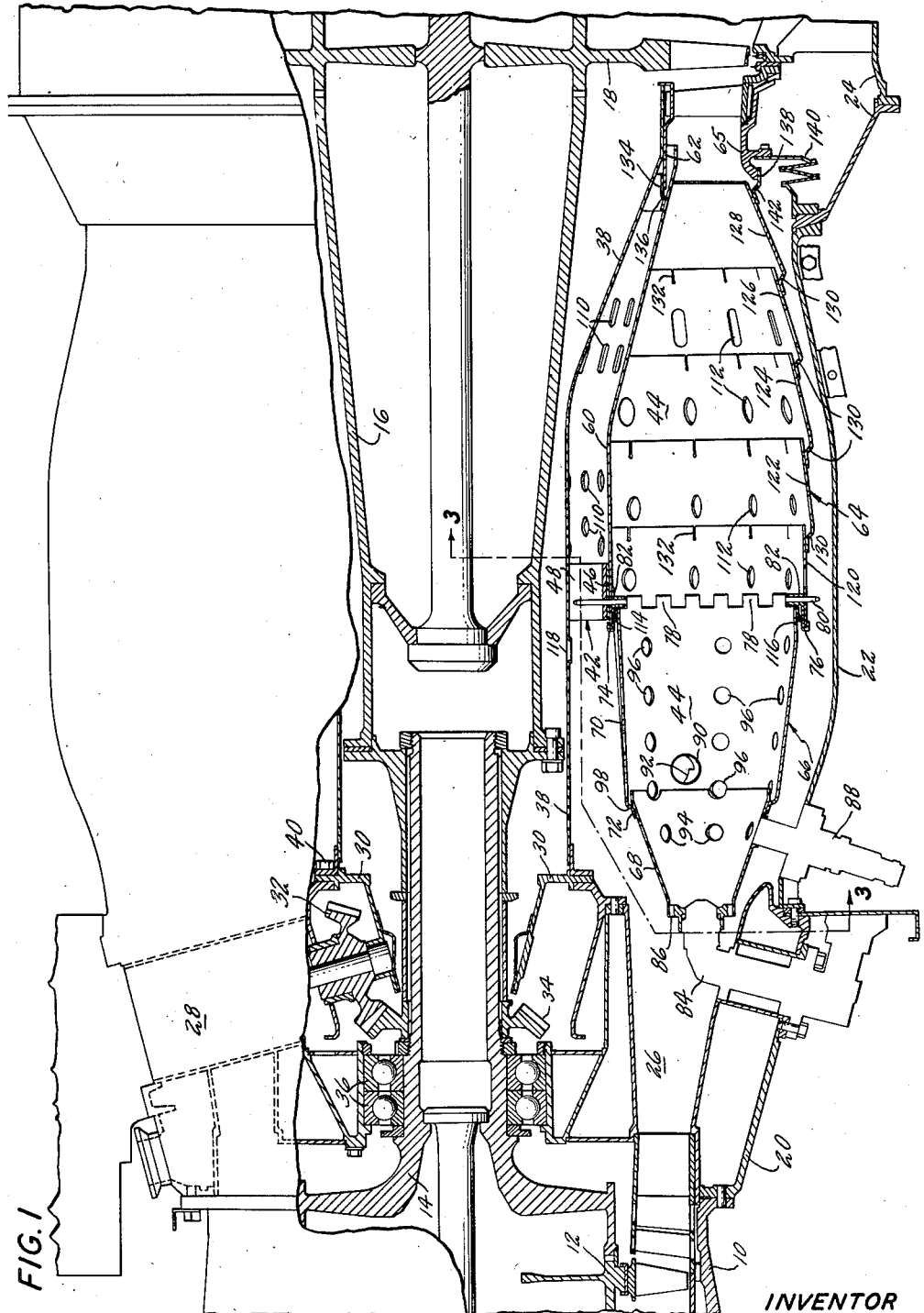
Fig. 1 is a longitudinal, fragmentary section through the mid-portion of a gas turbine power plant showing a combustion section construction in accordance with this invention.

Referring to the drawing in detail, in Fig. 1 compressor casing 10 surrounds bladed compressor rotor 12, only the downstream end of the casing and rotor being shown. End shaft 14 of compressor rotor 12 is joined to turbine shaft 16 which carries one or more bladed turbine discs 18. Accessory case 20 is connected to the downstream end of compressor casing 10 and at its downstream end is connected to combustion section casing 22. Turbine casing 24, in turn, is connected to the downstream end of combustion section casing 22.

Accessory case 20 defines an annular air passage 26, the inner portion of the housing being supported by a plurality of radially extending struts 28, only one of which is shown. Power plant accessories as well as the mounts by which the power plant is supported within aircraft structure are attached to the periphery of the accessory case, but neither the accessories nor the mounts are identified as they form no part of the present invention. The accessories are driven by gear shafts, not shown, extending through struts 28. An adapter housing 30 is mounted within the inner portion of accessory case 20 and secured thereto. This housing contains intermediate drive gears 32, only one of which is shown, meshing with accessory drive gear 34 on end shaft 14, and provides a seat for ball bearings 36 which support the downstream end of the compressor rotor within the power plant.

Figure 3:
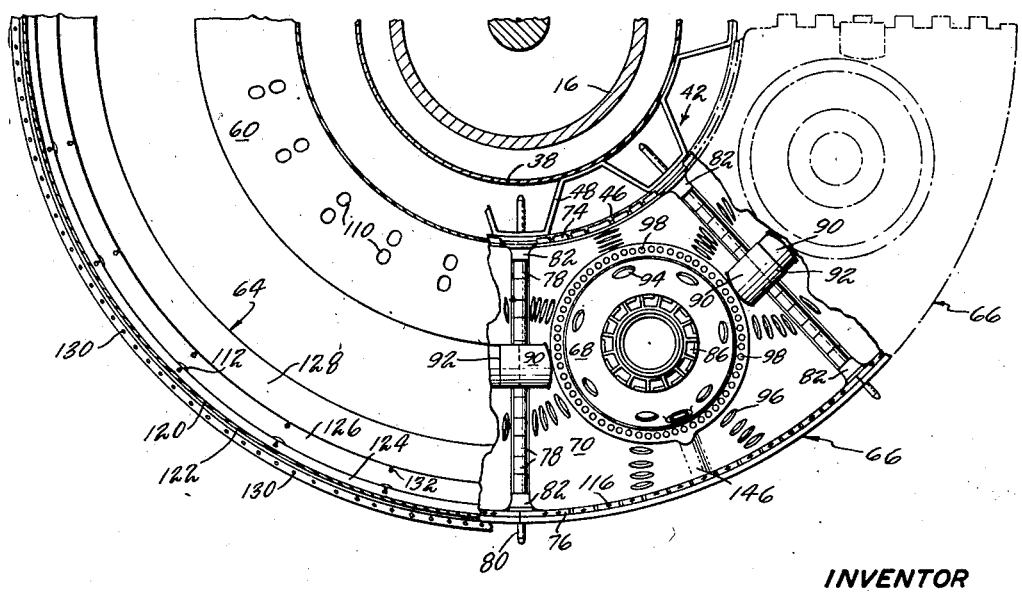
Fig. 3 is a staggered section along line 3—3 in Fig. 1 showing elements pertinent to the invention, other parts having been omitted for clearness.

The adapter housing 30 also serves as a supporting member for sleeve 38 which is bolted to the adapter housing by bolts 40 and which closely surrounds end shaft 14 and turbine shaft 16. This sleeve forms the inner wall of the combustion section and together with combustion section casing 22 defines an annular air passage which is a continuation of passage 26 in accessory case 20. Sleeve 38 is provided intermediate its ends with a mounting structure 42 to which the elements defining combustion chamber 44 are attached. In the embodiment shown this structure includes a flat ring 46 surrounding sleeve 38 and held in spaced relation thereto by a member of webbing 48 which may, as shown in Fig. 3, be parts of a single wiggle strip.

An inner liner 60 surrounds sleeve 38 and is connected at its upstream end to the mounting structure 42 and supported at its downstream end by flange 62 on sleeve 38. An outer liner 64 surrounds inner liner 60 and is connected at its upstream end to the mounting structure 42 as will be apparent from the following description and supported at its downstream end by first stage nozzle casing 65. The outer liner is spaced inwardly of combustion section casing 22 and together with inner liner 60 defines an annular portion of combustion chamber 44, the liners converging in a downstream direction.

A plurality of modified cans 66, in this case eight cans, are mounted between the upstream ends of the liners and, while in effect closing the upstream end of the annular portion of the combustion chamber defined by the liners, define openings into the portion. Each can is comprised of a plurality of elements 68 and 70, the elements being welded together at 72. Element 68 is substantially a truncated cone, being of circular cross section, and element 70 is circular in section through the plane of weld 72 but gradually is transformed in section in a downstream direction from a circle to an annular segment or trapezoid. Adjacent cans adjoin at their downstream end and together form a ring substantially closing the upstream end of the annular portion of chamber 44 defined by liners 60 and 64.

Clips 74 and 76 are welded to the curved inner and outer, or parallel, edges, respectively, of the downstream section of the cans, clip 74 forming an overlapping joint with the upstream end of inner liner 60 and clip 76 forming an overlapping joint with the upstream end of outer liner 64. These clips support the cans and liners with respect to each other. The radial, or non-parallel, edges of the downstream section of the cans are folded over and cut to form a row of eyes 78, the eyes on adjacent edges of adjacent cans cooperating to form a hinge-like structure. A pin 80 extends through outer liner 64, eyes 78, inner liner 60, and ring 46 and serves to connect the liners and cans to each other and to mounting structure 42. Combustion section casing 22 and sleeve 38 limit radial motion of the pins and prevent the parts from becoming disconnected. Lugs 82 welded about the circumference of the liners help to pilot pins 80 and act as closures between the corners of adjacent cans.

By virtue of this construction, the combustion chamber elements are supported by accessory case 20 through adapter housing 30, sleeve 38, mounting structure 42 and pins 80. With the elements connected together in a single radial plane, that of pins 80, the cans and liners are free to expand radially, cans 66 are free to expand in an upstream direction with respect to the pins, and liners 60 and 64 are free to expand in a downstream direction with respect to the pins. As can be seen in Fig. 1, the downstream end of each of the liners 60 and 64 has a sliding fit with flange 62 and turbine nozzle casing 65, respectively, permitting relative axial motion therebetween.

A fuel nozzle 84 is mounted within the upstream end of each of cans 66, a sliding fit between the nozzle and the cans being provided to permit longitudinal movement of the cans with respect to the nozzles. A plurality of swirler vanes 86 are mounted within the inlet of each can and surround fuel nozzle 84. Spark plug 88 is shown in position in can element 68 and is used for igniting the mixture of fuel and air within can 66. While each can does not contain a spark plug, it is preferable to use several plugs scattered through the combustion section to start combustion at several points. Cross-over tubes 90 connect adjacent cans 66 and once the fuel-air mixture has been ignited in one of the cans, combustion spreads through the cross-over tubes to adjacent cans. An extension 92 is provided on the cross-over tubes of every other can 66 to shield the combustion gases passing through the cross-over tubes from the high-velocity air passing longitudinally through the combustion section.

Gases which have been compressed by bladed compressor rotor 12 are diffused as they pass through annular air passage 26 in accessory case 20 and further diffused when they enter the annular air passage defined by combustion section casing 22 and sleeve 38. Some of the gases leaving passage 26 pass through swirler vanes 86 surrounding fuel nozzle 84 and enter can element 68 to mix with fuel injected by the fuel nozzle. Additional air for combustion purposes is admitted through circumferential row of holes 94 in can element 68 and through one or more circumferential rows of holes 96 is transition element 70. The number and spacing of these holes are determined by combustion requirements and may be varied at will to give the desired burning within combustion chamber 44. Air also is admitted to can 66 through small holes 98 at the junction between can elements 68 and 70 to cool the wall of element 70, the downstream extension of cone element 68 helping to guide the air across the inner wall of element 70.

Circumferential rows of holes 110 in inner liner 60 and circumferential rows of holes 112 in outer liner 64 permit the introduction of additional air into the combustion chamber for combustion purposes and to cool the gases to a temperature which will not harm the blades on turbine disc 18. As with the holes in can 66, the number, shape, and spacing of the holes in the liners may be varied at will and are determined by the dictates of the power plant. Rows of holes 114 and 116 are provided in clips 74 and 76, respectively, to permit the introduction of cooling air at the junction of the cans and liners. One or more ports 118 are provided in sleeve 38 to admit air to the interior thereof for cooling purposes.

Inner liner 60 is preferably of one piece construction although during early testing of this combustion section structure, it was split longitudinally into halves to permit removal, reworking or replacement without the necessity of a major disassembly of the power plant. Outer liner 64, on the other hand, is a composite structure made up of a plurality of rings 120, 122, 124, 126 and 128 jointed together to form the liner. Rings 122, 124, 126 and 128 are stepped at their upstream end and provided with a row of holes 130 for admitting air to cool the inner surface of the rings. The downstream end of rings 120, 122, 124 and 126 may be slotted as at 132 to permit radial expansion. The advantage of the composite structure is twofold; one, in the control of the admission of air through holes 130 for cooling outer liner 64, and, two, in increased strength of the liner without increasing the thickness thereof.

While inner liner 60 is shown as a single piece member, it may be a composite structure such as outer liner 64 if desired. Likewise either or both of elements 68 and 70 of can 66 may be a composite structure such as outer liner 64 if cooling air is required or added strength is desired.

Flange 134 on the downstream end of inner liner 60 is in sliding engagement with flange 62 on sleeve 38. Inner liner 60, flange 134, flange 62, and sleeve 38 combine to form a closure at the downstream end of the air space between the inner liner and the sleeve, forcing substantially all of the air flowing through the space to enter holes 110 in the inner liner. If desired, holes 136 may be provided in flange 134 to permit the flow of cooling air across the downstream end of the inner liner and flange 62. A closure for the downstream end of the air space between combustion section casing 22 and outer liner 64 is defined by flange 138 on the downstream end of the outer liner, nozzle casing 65, and expansion member 140. This closure forces substantially all of the air flowing through the space between casing 22 and outer liner 64 to enter holes 112 and 130 in the outer liner. If desired, holes 142 may be provided in flange 138 to direct cooling air across the downstream end of the outer liner and across the inner surface of nozzle casing 65.

Figure 2:
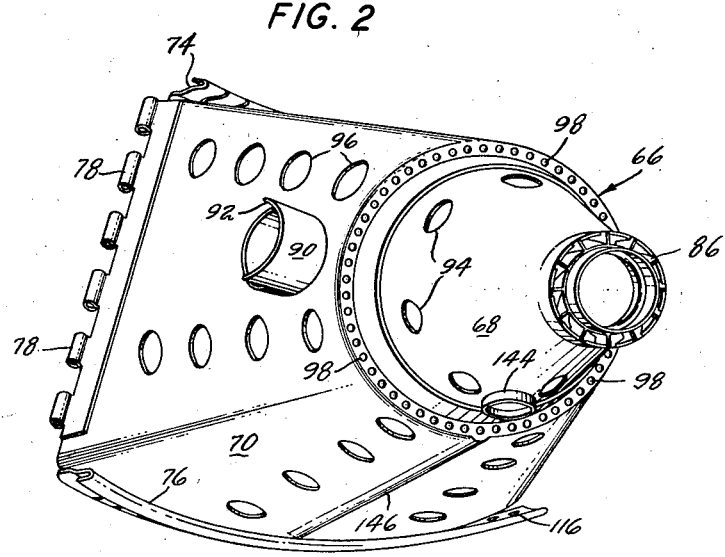
Fig. 2 is a three-quarter front view of one of the cans.

Fig. 2 is an enlarged view of one of cans 66 showing many of the features of construction. Among those which can be seen are the upstream opening in which the fuel nozzle is located, swirler vanes 86 which surround the fuel nozzle and impart a vortical motion to the air passing therethrough, air inlet holes 94 in can element 68, opening 144 for the spark plug, holes 98 at the junction between element 68 and element 70 through which cooling air is admitted, air inlet holes 96 in element 70, cross-over tube 90 and extension 92, clips 74 and 76 welded to the parallel edges of the downstream end of the can, holes 116 in clip 76 through which cooling air is admitted to the junction between the can and the outer liner, and a row of eyes 78 on the radial edge of the can. A rib 146 extends longitudinally along the surface of element 70 and serves to strengthen the element.

Fig. 3 is a staggered section looking downstream from air passage 26 toward the combustion section structure. Two cans 66 are shown in position at the upstream end of the combustion section and to the left of these cans is shown the downstream, annular portion of the combustion chamber defined by liners 60 and 64. The hinge-like structure formed by eyes 78 is readily discernible and the manner in which pins 80 connect the cans and liners to ring 46 and webbing 48 of mounting structure 42 is apparent. Lugs 82 which fill the outside spaces between adjacent cans can be seen as can the manner in which extensions 92 on cross-over tubes 90 cover adjacent cross-over tubes and shield the gases therein from the air passing longitudinally through the combustion section.

It is to be understood that the invention is not limited to the specific embodiment herein illustrated and described, but may be used in other ways without departure from its spirit as defined by the following claims:

I claim:

1. In combustion apparatus, an inner cylindrical sleeve, an outer cylindrical sleeve spaced outwardly from said inner sleeve and defining between said sleeves an annular gas path from the upstream end of the sleeves to the downstream end, a first liner surrounding said inner sleeve and projecting in an upstream direction from a point adjacent the downstream end of said inner sleeve, said inner sleeve and said liner having an axially slidable connection at the downstream end, a second liner surrounding said first liner in spaced relation thereto, and spaced inwardly of the outer sleeve, said second liner being supported at its downstream end for axial sliding movement, a plurality of cans attached to the upstream ends of said liners and projecting upstream therefrom between the sleeves, each of said cans being substantially circular at its upstream end and being supported at its upstream end for axial movement, each can merging from its circular shape to a segment of an annulus at its downstream end, the spacing of the inner and outer walls of the segment of the annulus corresponding to the spacing of the liners at the upstream end, said inner and outer walls and said liners having interfitting means to support said liners and said inner and outer walls against relative movement radially, the radially extending walls of adjacent segments of the annulus having interengaging means, supporting means extending between said first sleeve and the inner liner adjacent the upstream end of the liner to support the inner liner and the cans radially at this point, and securing means extending radially inward from said interengaging means and into engagement with said supporting means for holding the inner liner and the cans against axial movement at this point.

2. In combustion apparatus, an inner cylindrical sleeve, an outer cylindrical sleeve spaced outwardly from said inner sleeve and defining between said sleeves an annular gas path from the upstream end of the sleeves to the downstream end, a first liner surrounding said inner sleeve and projecting in an upstream direction from a point adjacent the downstream end of said inner sleeve, said inner sleeve and said liner having an axially slidable connection at the downstream end, a second liner surrounding said first liner in spaced relation thereto, and spaced inwardly of the outer sleeve, said second liner being supported at its downstream end for axial sliding movement, a plurality of cans attached to the upstream ends of said liners and projecting upstream therefrom between the sleeves, each of said cans being substantially circular at its upstream end and being supported at its upstream end for axial movement, a fuel nozzle for each can in fixed relation to said outer sleeve, the upper end of the associated can fitting over and axially slidable on the nozzle, each can merging from its circular shape to a segment of an annulus at its downstream end, the spacing of the inner and outer walls of the segment of the annulus corresponding to the spacing of the liners at the upstream end, said inner and outer walls and said liners having interfitting means to support said liners and said inner and outer walls against relative movement radially, the radially extending walls of adjacent segments of the annulus having interengaging means, supporting means extending between said first sleeve and the inner liner adjacent the upstream end of the liner to support the inner liner and the cans radially at this point, and securing means extending radially inward from said interengaging means and into engagement with said supporting means for holding the inner liner and the cans against axial movement at this point.

3. In combustion apparatus, an inner cylindrical sleeve, an outer cylindrical sleeve spaced outwardly from said inner sleeve and defining between said sleeves an annular gas path from the upstream end of the sleeves to the downstream end, a first liner surrounding said inner sleeve and projecting in an upstream direction from a point adjacent the downstream end of said inner sleeve, said inner sleeve and said liner having an axially slidable connection at the downstream end, a second liner surrounding said first liner in spaced relation thereto, and spaced inwardly of the outer sleeve, said second liner being supported at its downstream end for axial sliding movement, a plurality of cans attached to the upstream ends of said liners and projecting upstream therefrom between the sleeves, each of said cans being substantially circular at its upstream end and being supported at its upstream end for axial movement, each can merging from its circular shape to a segment of an annulus at its downstream end, the spacing of the inner and outer walls of the segment of the annulus corresponding to the spacing of the liners at the upstream end, said inner and outer walls and said liners having interfitting means to support said liners and said inner and outer walls against relative movement radially, the radially extending walls of adjacent segments of the annulus having interengaging means, supporting means extending between said first sleeve and the inner liner adjacent the upstream end of the liner to support the inner liner and the cans radially at this point, and securing means extending radially inward from said interengaging means and into engagement with said supporting means for holding the inner liner and the cans against axial movement at this point, said securing means being in the form of radially extending pins projecting through said interengaging means and into said supporting means.

References Cited in the file of this patent

UNITED STATES PATENTS

| | | |
|---|---|---|
| 2,547,619 | Buckland | Apr. 3, 1951 |
| 2,555,965 | Garber | June 5, 1951 |
| 2,560,223 | Hanzalek | July 10, 1951 |
| 2,595,999 | Way et al. | May 6, 1952 |
| 2,615,300 | Lombard | Oct. 28, 1952 |
| 2,616,258 | Mock | Nov. 4, 1952 |

FOREIGN PATENTS

| | | |
|---|---|---|
| 588,572 | Great Britain | May 28, 1947 |